US010728254B2

(12) United States Patent
Hakata et al.

(10) Patent No.: US 10,728,254 B2
(45) Date of Patent: Jul. 28, 2020

(54) MANAGEMENT SYSTEM, COMMUNICATION SYSTEM, AND MANAGEMENT METHOD

(71) Applicants: Mayu Hakata, Kanagawa (JP); Takeshi Horiuchi, Tokyo (JP)

(72) Inventors: Mayu Hakata, Kanagawa (JP); Takeshi Horiuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

(21) Appl. No.: 15/621,074

(22) Filed: Jun. 13, 2017

(65) Prior Publication Data

US 2017/0374078 A1 Dec. 28, 2017

(30) Foreign Application Priority Data

Jun. 23, 2016 (JP) ................................. 2016-124751

(51) Int. Cl.
*H04L 29/06* (2006.01)
*G06F 21/33* (2013.01)
*G06F 21/62* (2013.01)

(52) U.S. Cl.
CPC .......... *H04L 63/104* (2013.01); *G06F 21/335* (2013.01); *G06F 21/62* (2013.01);
(Continued)

(58) Field of Classification Search
CPC .............................. H04L 63/0807; G06F 21/62
(Continued)

(56) References Cited

U.S. PATENT DOCUMENTS

| 2009/0328207 A1* | 12/2009 | Patel | ....................... G06F 21/10 |
| | | | 726/22 |
| 2011/0154439 A1* | 6/2011 | Patel | ..................... G06F 21/554 |
| | | | 726/3 |

(Continued)

FOREIGN PATENT DOCUMENTS

| JP | 2010-026653 | 2/2010 |
| JP | 2015-005202 | 1/2015 |
| JP | 2015-220508 | 12/2015 |

OTHER PUBLICATIONS

U.S. Appl. No. 15/308,700, filed Nov. 3, 2016.
U.S. Appl. No. 15/447,568, filed Mar. 2, 2017.

*Primary Examiner* — Teshome Hailu
(74) *Attorney, Agent, or Firm* — Oblon, McClelland, Maier & Neustadt, L.L.P.

(57) ABSTRACT

A management system, a communication system, and a management method. The management system and the management method include receiving a request to associate identification information of a first user with identification information of a first client application that the first user is authorized to use, and identification information of a second user who has been authenticated and has been authorized to use a second client application, determining whether the identification information of the second user matches certain information that corresponds to the first client application, and associating the identification information of the first user with the identification information of the first client application when the determining determines that the identification information of the second user matches the certain information that corresponds to the first client application. The communication system includes the management system, and a communication terminal that sends the access token to the management system.

8 Claims, 7 Drawing Sheets

(52) U.S. Cl.
CPC ...... *H04L 63/0807* (2013.01); *H04L 63/0815* (2013.01); *G06F 21/33* (2013.01); *H04L 63/20* (2013.01)

(58) Field of Classification Search
USPC .......................................................... 726/28
See application file for complete search history.

(56) References Cited

U.S. PATENT DOCUMENTS

| | | |
|---|---|---|
| 2013/0111362 A1* | 5/2013 | Alexandrov ........ H04L 12/1818 715/753 |
| 2015/0381665 A1 | 12/2015 | Horiuchi et al. |
| 2016/0044278 A1 | 2/2016 | Horiuchi et al. |
| 2016/0259936 A1* | 9/2016 | Mukherjee .............. G06F 21/45 |
| 2016/0269681 A1 | 9/2016 | Horiuchi et al. |
| 2016/0269682 A1 | 9/2016 | Horiuchi et al. |
| 2016/0269973 A1 | 9/2016 | Miyamoto et al. |
| 2017/0034475 A1 | 2/2017 | Horiuchi et al. |
| 2017/0063939 A1 | 3/2017 | Miyamoto et al. |
| 2017/0064251 A1 | 3/2017 | Soneda et al. |
| 2017/0078405 A1 | 3/2017 | Horiuchi et al. |
| 2017/0093762 A1 | 3/2017 | Horiuchi et al. |
| 2017/0093857 A1 | 3/2017 | Hinohara et al. |
| 2017/0142099 A1 | 5/2017 | Hinohara et al. |
| 2017/0149755 A1 | 5/2017 | Soneda et al. |

\* cited by examiner

| USER ID | USER NAME | USER PASSWORD |
|---------|-----------|---------------|
| USER00  | USER m    | 0x0x          |
| USER01  | USER x    | 1x1x          |
| USER02  | USER y    | 2x2x          |
| USER03  | USER a    | 3x3x          |

FIG. 5B

| CLIENT ID | CLIENT NAME | CLIENT PASSWORD | DEVELOPER ID |
|-----------|-------------|-----------------|--------------|
| C00       | ASSOCIATION APPLICATION | www | dev00 |
| C01       | SCREEN SHARING APPLICATION | xxx | dev01 |
| C02       | TALKING APPLICATION | yyy | dev02 |

FIG. 5C

| CLIENT ID | USER ID | AVAILABLE PERIOD |
|-----------|---------|------------------|
| C00       | user00, user01, user02 | 2015/1/1 – 2020/12/31 |
| C01       | user03  | 2015/6/1 – 2022/5/31 |
| C02       | user03  | 2016/1/1 – 2017/12/31 |

FIG. 5D

| DEVELOPER ID | NAME | USER ID |
|--------------|------|---------|
| dev00        | ADMINISTRATOR | user00 |
| dev01        | THIRD PAERY x | user01 |
| dev02        | THIRD PARTY y | user02 |

FIG. 6

MANAGEMENT SYSTEM, COMMUNICATION SYSTEM, AND MANAGEMENT METHOD

CROSS-REFERENCE TO RELATED APPLICATION

This patent application is based on and claims priority pursuant to 35 U.S.C. § 119(a) to Japanese Patent Application No. 2016-124751, filed on Jun. 23, 2016, in the Japan Patent Office, the entire disclosure of which is hereby incorporated by reference herein.

BACKGROUND

Technical Field

Embodiments of the present invention relate to a management system, a communication system, and a management method.

Background Art

The communications protocols such as OAuth 2.0 are known in the art where a user can use a client application after the user is authenticated and authorized to use the client application. In such communications protocols, the servers associate the users with the client applications that these users are authorized to use, and store such associated data as the information used to decide whether or not to authorize the use of the client applications. The association between the users and the client applications is updated according to the payment of the bill from users to the developer of a client application or the expiration of the available period.

A communication terminal that has certain communication identification (ID) can use the functions (applications) with the function ID specified in the items of function ID in an available period management table, within the available period.

SUMMARY

Embodiments of the present disclosure described herein provide a management system, a communication system, and a management method. The management system and the management method include receiving a request to associate identification information of a first user with identification information of a first client application that the first user is authorized to use, and identification information of a second user who has been authenticated and has been authorized to use a second client application, determining whether the identification information of the second user matches certain information that corresponds to the first client application, and associating the identification information of the first user with the identification information of the first client application when the determining determines that the identification information of the second user matches the certain information that corresponds to the first client application. The communication system includes the management system, and a communication terminal that sends the access token to the management system.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

Figure 1:
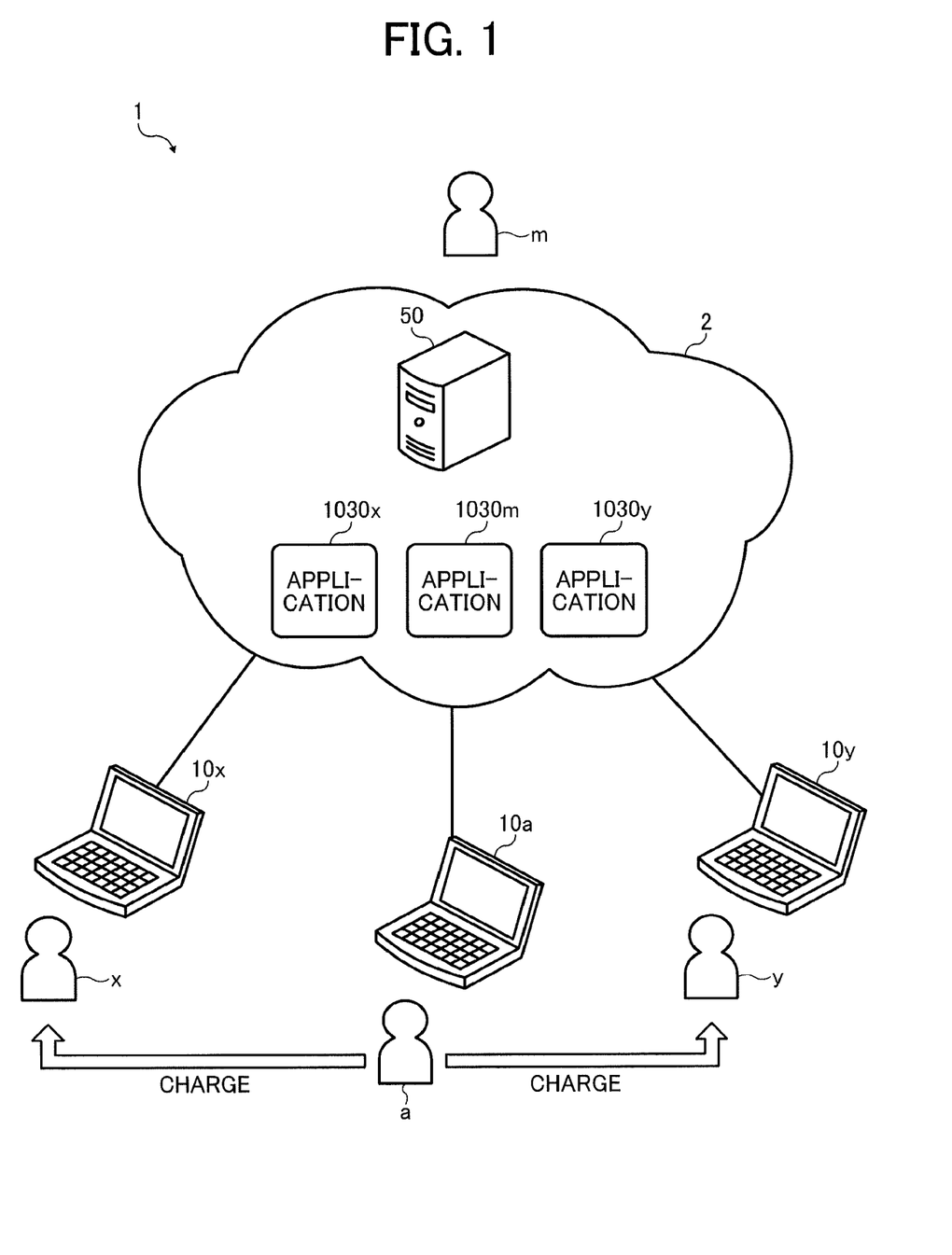
FIG. 1 is a schematic diagram illustrating a configuration of a communication system according to an embodiment of the present disclosure.

FIG. 1 is a schematic diagram illustrating a configuration of a communication system 1 according to an embodiment of the present disclosure.

The communication system 1 is a service provision system that uses OAuth 2.0 as an example of an authentication/authorization protocol. In FIG. 1, for the descriptive purposes, the administrator of the service provision system is illustrated as he or she resides on a communication network 2, and users of the service provision system are connected to the communication network 2 via corresponding communication terminals 10.

Hereinafter, any one of communication terminals 10a, 10x, and 10y will be referred to as a communication terminal 10. The communication system 1 includes the communication terminals 10 and the management system 50. The communication terminal 10 may be, for example, a general-purpose terminal such as a tablet personal computer (PC), a smartphone, and a PC, or a personal communication terminal such as a television conference terminal, an electronic whiteboard, digital signage, and a camera. In the communication system 1, the number and type of the communication terminal is not limited. The types of the communication terminals 10 may be similar to each other, or may be different from each other.

Hereinafter, a client application that is used in the communication system 1 is referred to as an "application". Such an application is stored, for example, in the management system 50 or any server connected to the communication network 2, and may operate in the management system 50 or on the server. Alternatively, an application is installed in the communication terminal 10 and may operate on the communication terminal 10. An application is developed by the administrator of the service provision system or a user of the service provision system. Among the users of the service provision system, the developers of an application are referred to as a third party. By contrast, the users of the service provision system other than the developers of an application are referred to as an end user. A user m is the administrator of the service provision system, and the developer of an application 1030m. A user x belongs to the third party, and is the developer of an application 1030x. A user y belongs to the third party, and is the developer of an application 1030y. A user a is an end user. Note that the number of applications, third parties, and end users is not limited to the number illustrated in FIG. 1.

The management system 50 associates each application with the users who can use that application and the period during which those users can use that application. Due to this configuration, the management system 50 can give access right to an application on a user-by-user basis. Note also that the term "association" used herein indicates that a user is associated with an application that the user is authorized to use. The management system 50 may manage a particular application at cost depending on the term in which the management system 50 manages that application. If an end user pays the bill, under instructions from the third parties, the management system 50 associates a user with the application for which the user has paid the bill.

<<Hardware Configuration>>

Next, the hardware configuration of the elements of the communication system 1 is described.

Figure 2:
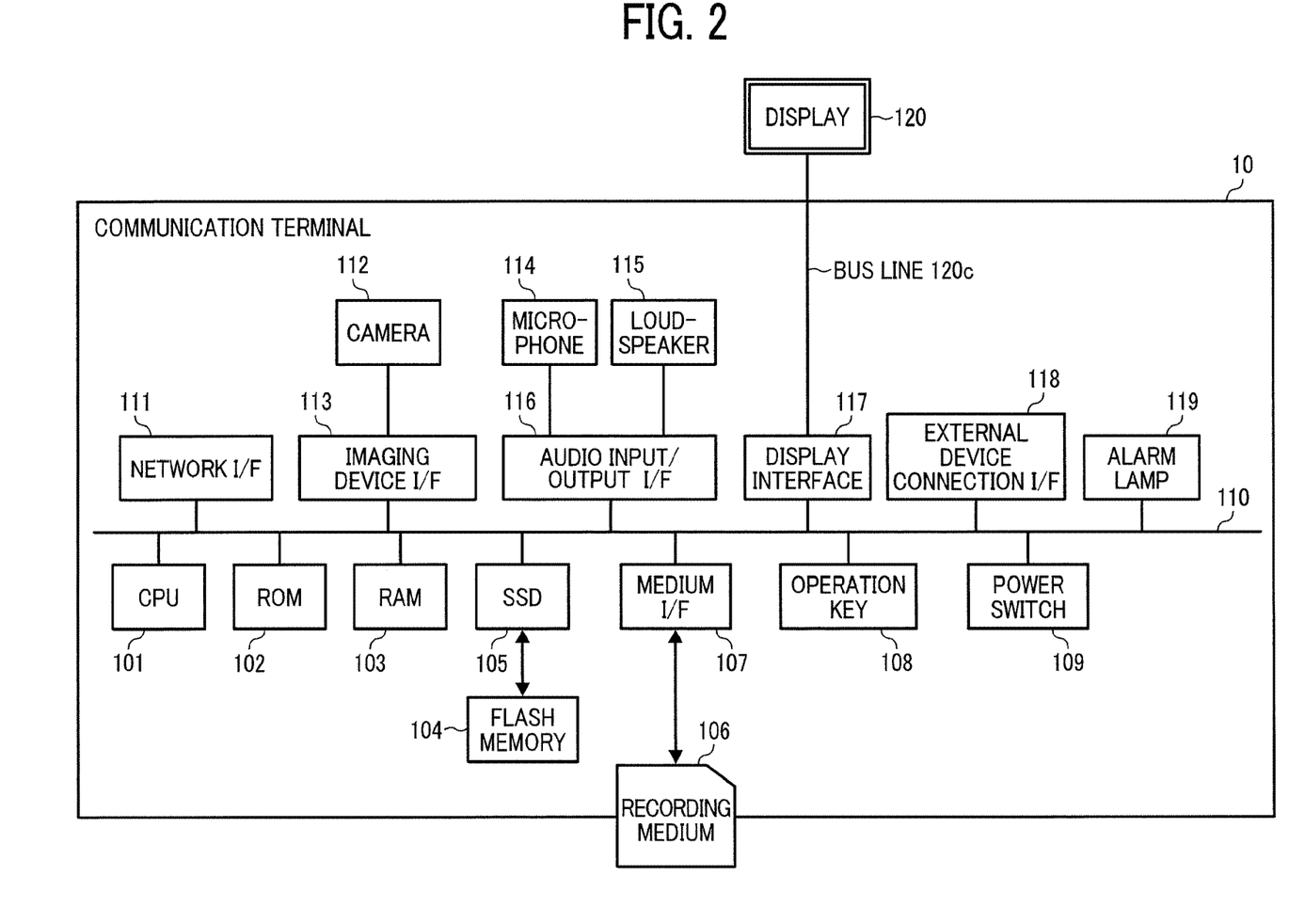
FIG. 2 is a schematic block diagram illustrating a hardware configuration of a communication terminal according to an embodiment of the present disclosure.

FIG. 2 is a schematic block diagram illustrating the hardware configuration of the communication terminal 10 according to the present embodiment.

The hardware configuration of the communication terminal 10 is not limited to the hardware configuration illustrated in FIG. 2 as long as the communication terminal 10 is capable of performing communication. For example, the communication terminal 10 may include an additional element that is not illustrated in FIG. 2. Alternatively, some of the elements illustrated in FIG. 2 may be omitted. Moreover, some of the elements illustrated in FIG. 2 may be, for example, an external device that can be coupled to the communication terminal 10. As illustrated in FIG. 2, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106 such as a flash memory or integrated circuit (IC) card, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2.

The communication terminal 10 further includes the built-in camera 112 that captures an image of a subject and obtains image data under control of the CPU 101, an imaging element I/F 113 that controls driving of the camera 112, the built-in microphone 114 that receives an audio input, the built-in loudspeaker 115 that outputs sounds, an audio input and output (input/output) interface (I/F) 116 that processes inputting/outputting of an audio signal between the microphone 114 and the loudspeaker 115 under control of the CPU 101, a display interface (I/F) 117 that transmits image data to an external display 120 under control of the CPU 101, an external device connection interface (I/F) 118 for connecting various external devices, an alarm lamp 119 for notifying of an error in functionality of the communication terminal 10, and a bus line 110 such as an address bus and a data bus for electrically connecting the above-described elements as illustrated in FIG. 2.

The display 120 is a display made of liquid crystal or organic electroluminescence (EL) that displays an image of a subject, an operation icon, or the like. The display 120 is connected to the display interface 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject to electronic data through photoelectric conversion. As the solid-state imaging element, for example, a complementary metal-oxide-semiconductor (CMOS) or a charge-coupled device (CCD) is used.

To the external device connection interface 118, an external device such as an external camera, an external microphone, and an external loudspeaker can be electrically connected, through a Universal Serial Bus (USB) cable or the like that is inserted into a connection port 1132 of the housing of a housing 1100. In cases where an external camera is connected, the external camera is driven on a priority basis and the built-in camera 112 is not driven under the control of the CPU 101. In a similar manner to the above, in the case where an external microphone is connected or an external loudspeaker is connected, the external microphone or the external loudspeaker is driven under the control of the CPU 101 on a top-priority basis over the built-in microphone 114 or the built-in loudspeaker 115.

The recording medium 106 is removable from the communication terminal 10. In addition, a nonvolatile memory that reads or writes data under the control of the CPU 101 is not limited to the flash memory 104, and for example, an electrically erasable and programmable read-only memory (EEPROM) may be used instead.

Figure 3:
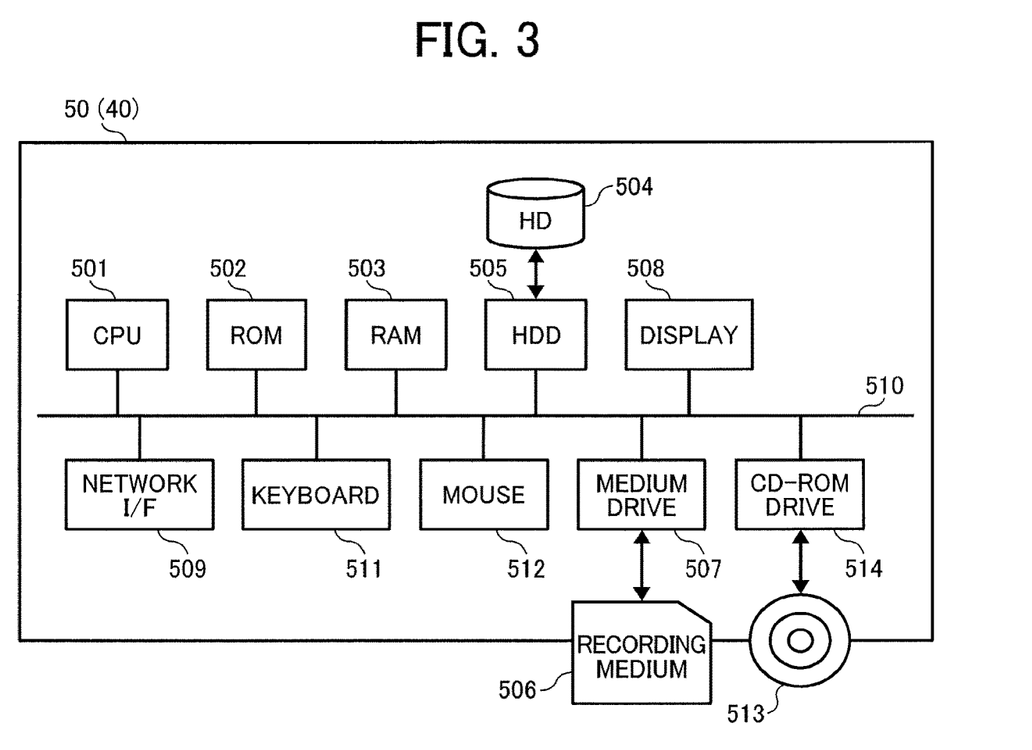
FIG. 3 is a schematic block diagram illustrating a hardware configuration of a management system according to an embodiment of the present disclosure.

FIG. 3 is a schematic block diagram illustrating a hardware configuration of the management system 50 according to the present embodiment.

The management system 50 according to the present embodiment includes a CPU 501 that controls the entire operation of the management system 50, a ROM 502 that stores a control program for controlling the CPU 501 such as the IPL, a RAM 503 that is used as a work area for the CPU 501, a hard disk (HD) 504 that stores various kinds of data such as a control program for the management system 50, a hard disk drive (HDD) 505 that controls reading or writing of various kinds of data to or from the HD 504 under control of the CPU 501, a medium drive 507 that controls reading or writing of data from and to a recording medium 506 such as a flash memory, a display 508 that displays various kinds of information such as a cursor, a menu, a window, a character, and an image, a network interface (I/F) 509 that performs data communication using the communication network 2, a keyboard 511 that is provided with a plurality of keys for allowing a user to input characters, numerical values, or various kinds of instructions, a mouse 512 for selecting or executing various kinds of instructions, selecting an object to be processed, or for moving a cursor, a compact disc read only memory (CD-ROM) drive 514 that reads or writes various kinds of data from and to a CD-ROM 513, which is one example of removable recording medium, and a bus line 510 such as an address bus or a data bus that electrically connects various elements as above to each other as illustrated in FIG. 3.

<<Functional Configuration>>

Next, the functional configuration according to the present embodiment is described.

Figure 4:
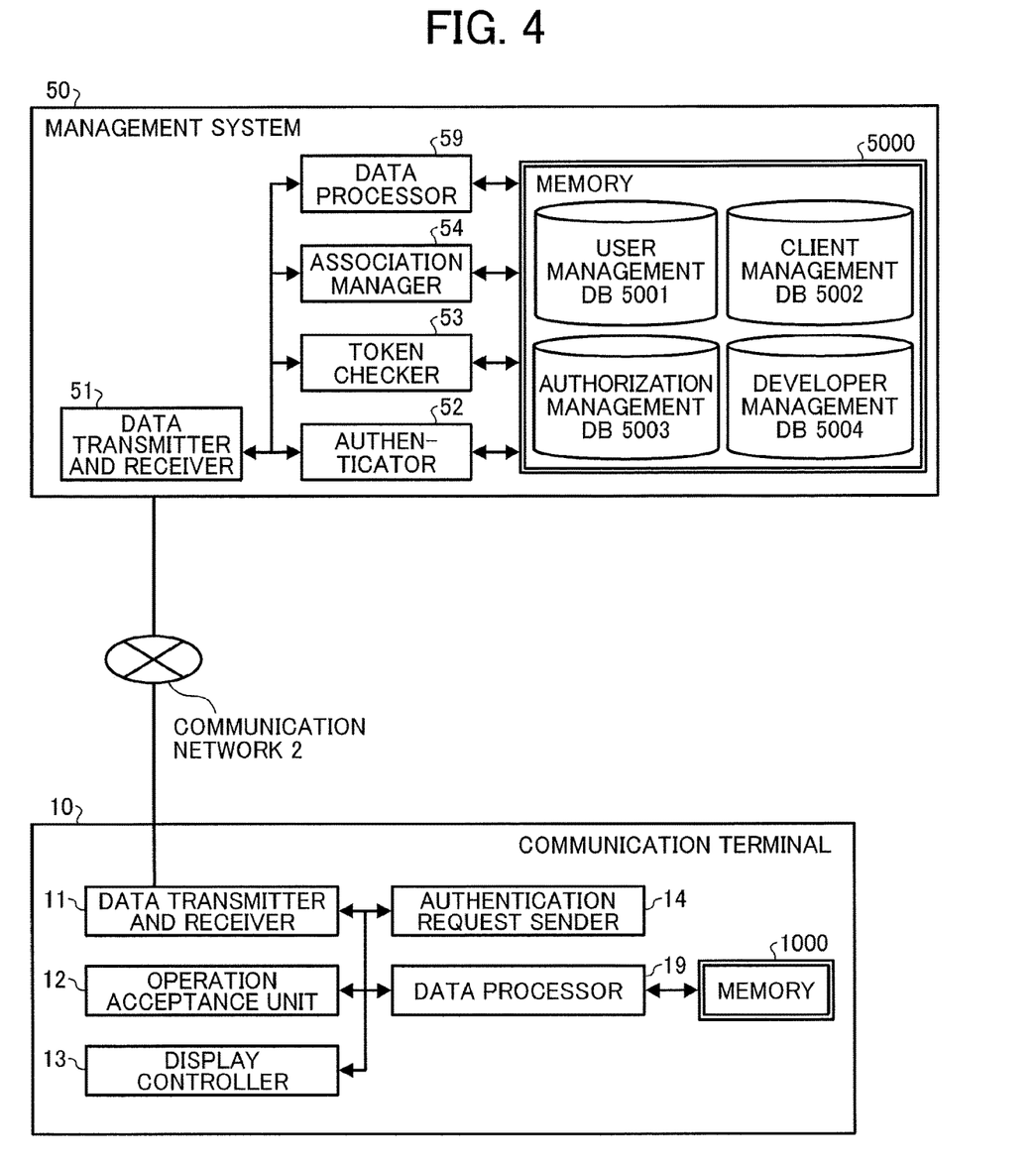
FIG. 4 is a functional block diagram of a communication terminal and a management system, according to an embodiment of the present disclosure.

FIG. 4 is a schematic block diagram illustrating a functional configuration of the communication terminal 10 and the management system 50 in the communication system 1, according to the present embodiment.

In FIG. 4, the communication terminal 10 and the management system 50 are connected with each other so as to perform data communication through the communication network 2.

<Functional Configuration of Communication Terminal>

The communication terminal 10 includes a data transmitter and receiver 11, an operation acceptance unit 12, a display controller 13, an authentication request sender 14, and a data processor 19. These elements are functions that are implemented by the operation of some of the hardware components illustrated in FIG. 2 executed by the instructions from the CPU 101 in accordance with a control program expanded from the flash memory 104 onto the RAM 103. The communication terminal 10 further includes a memory 1000 configured by the ROM 102, the RAM 103, and the flash memory 104 illustrated in FIG. 2.

<Detailed Functional Configuration of Communication Terminal>

Next, the functional configuration of the communication terminal 10 is described in detail with reference to FIG. 2 and FIG. 4. In the following description of the functional configuration of the communication terminal 10, the relation of the hardware elements in FIG. 2 with the functional configuration of the communication terminal 10 will also be described.

The data transmitter and receiver 11 is implemented by the network interface 111 and the instructions from the CPU 101 illustrated in FIG. 2, and transmits or receives various kinds of data (or information) to or from, for example, a counterpart communication terminal, devices and apparatuses, or a system, through the communication network 2.

The operation acceptance unit 12 are implemented by the instructions from the CPU 101, the operation key 108, or the power switch 109, and receives various kinds of inputs from the user or receives various kinds of selection made by the user.

The display controller 13 is substantially implemented by the instructions from the CPU 101 illustrated in FIG. 2 and the display interface 117 illustrated in FIG. 2, and sends the image data that is sent from the counterpart communication terminal to the display 120 during the conversation.

The authentication request sender 14 is implemented by the instructions from the CPU 101 illustrated in FIG. 2, and requests the management system 50 to perform authentication.

The data processor 19 is substantially implemented by the instructions from the CPU 101 and the SSD 105 each of which is illustrated in FIG. 2, or may be implemented only by the instructions from the CPU 101. The data processor 19 performs processing to store various types of data in the memory 1000, or read various types of data stored in the memory 1000.

<Functional Configuration of Management System>

The management system 50 includes a data transmitter and receiver 51, an authenticator 52, a token checker 53, an association manager 54, and a data processor 59. These units are functions implemented by or caused to function by operating some of the elements illustrated in FIG. 3 under the control of the instructions from the CPU 501. Note also that such instructions from the CPU 501 are made in accordance with a program for the management system 50 expanded from the HD 504 to the RAM 503. The management system 50 also includes a memory 5000 that is configured by the HD 504 illustrated in FIG. 3.

<User Management Table>

Figure 5A:
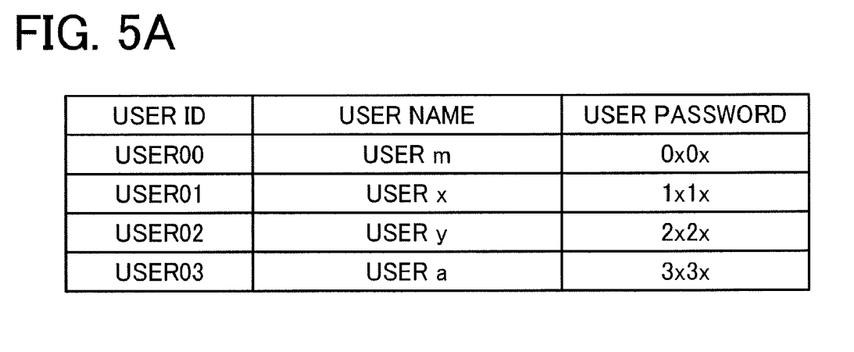
FIG. 5A, FIG. 5B, FIG. 5C, and FIG. 5D are diagrams each illustrating a data structure of a management table managed by a management system, according to an embodiment of the present disclosure.

FIG. 5A is a diagram illustrating an example data structure of a user management table, according to the present embodiment.

In the memory 5000, as illustrated in FIG. 4, a user management database (DB) 5001 that is made of a user management table is stored. In the user management table, for each user ID (identifier, identification), the user name and the user password are stored in association with each other. Moreover, in the user management table, the user who is the administrator and belongs to developers, the users who belongs to developers on the third party side, and end users are collectively managed. In the present embodiment, the developers include a company that manages the service provision system, and an organization such as third parties. In the present embodiment, ID and names may be indicated by any desired data such as a text, number, and a sign. The ID may be a mail address or a telephone number that could uniquely identify the user.

<Client Management Table>

Figure 5B:
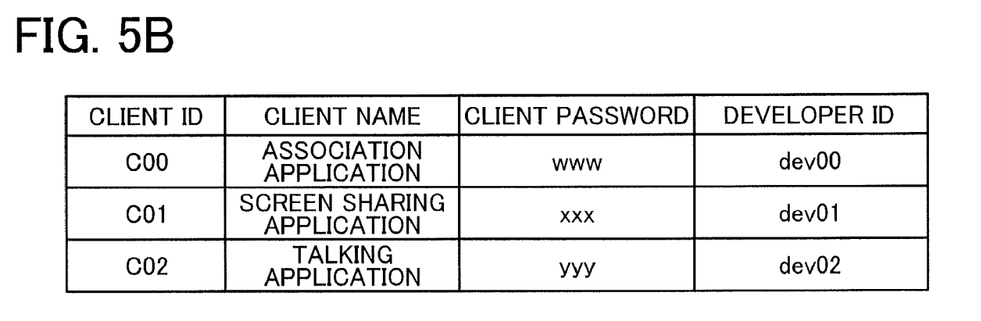

FIG. 5B is a diagram illustrating an example data structure of a client management table, according to the present embodiment.

In the memory 5000, as illustrated in FIG. 4, a client management database (DB) 5002 that is made of a client management table is stored. In the client management table, for each client ID that identifies a client application, the client name, client password, and the developer ID of the developer who has developed that client application are associated with each other.

Moreover, in the client management table, the applications that are developed by the administrator and the applications that are developed by the third parties are collectively managed. An association application in FIG. 5B corresponds to the application 1030*m* illustrated in FIG. 1, and a screen sharing application in FIG. 5B corresponds to the application 1030*x* illustrated in FIG. 1. Moreover, a talking application in FIG. 5B corresponds to the application 1030*y* illustrated in FIG. 1. The association application associates each application with the users who can use that application.

<Authorization Management Table>

Figure 5C:
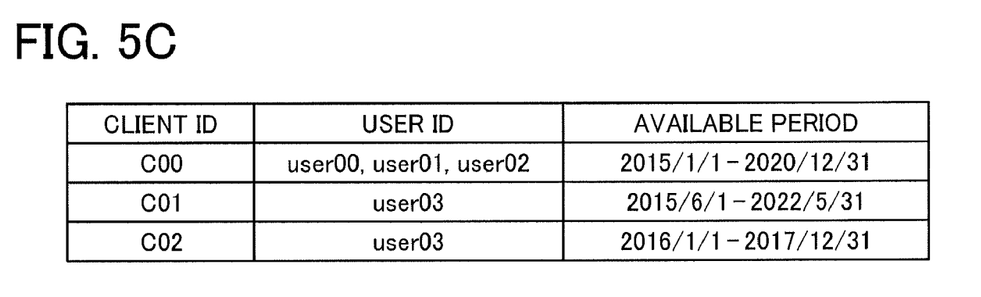

FIG. 5C is a diagram illustrating an example data structure of an authorization management table, according to the present embodiment.

In the memory 5000, as illustrated in FIG. 4, an authorization management database (DB) 5003 that is made of an authorization management table is stored. In the authorization management table, for each client ID, the user ID of the users who are authorized to use the application of that client ID is associated with the available period. In the field of user ID in the authorization management table, the user ID of the administrator, the user ID of third parties, and the user ID of end users are listed. For example, the association application of the client ID "C00" is developed specifically for the administrator and third parties, and is associated with the user ID of the administrator "user00" and the user ID of third parties "user01" and "user02" in the authorization management table. Moreover, the screen sharing application and the talking application of the client ID "C01" and "C02" are developed specifically for end users, and are associated with the user ID of the end user "user03" in the authorization management table.

<Developer Management Table>

Figure 5D:
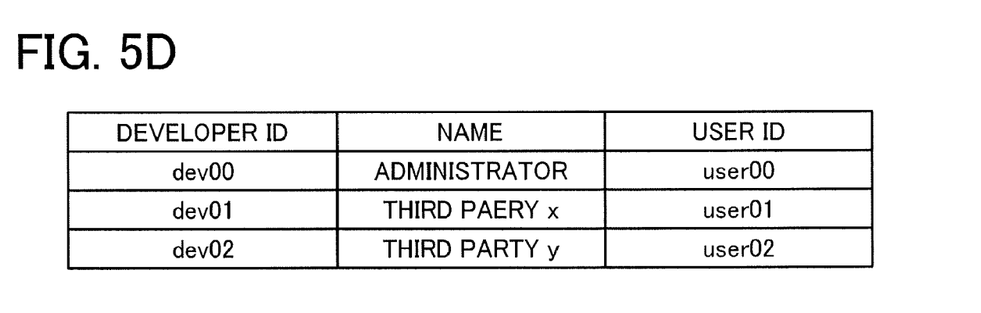

FIG. 5D is a diagram illustrating a developer management table according to an embodiment of the present disclosure.

In the memory 5000, as illustrated in FIG. 4, a developer management database (DB) 5004 that is made of a developer management table is stored. In the developer management table, for each name of the developer ID of developers, the names of the developer and the user ID of the users who belong to the developer party (i.e., the administrator or the third parties) are associated with each other. Note also that the user ID may be associated with two or more names of the developer ID.

<Detailed Functional Configuration of Management System>

Next, the functional configuration of the management system 50 is described in detail. In the following description of the functional configuration of the management system 50, the relation between the hardware configuration of FIG. 3 and the functional configuration of the management system 50 illustrated in FIG. 4 will also be described.

The data transmitter and receiver 51 is implemented by the network interface 509 and the instructions from the CPU 501 illustrated in FIG. 3, and transmits or receives various kinds of data (or information) to or from the other communication terminals, apparatuses, or systems through the communication network 2.

The authenticator 52 is implemented by the instructions from the CPU 501 illustrated in FIG. 3, and authenticates a user and authenticates a client in response to a request from the communication terminal 10. Then, the authenticator 52 issues an access token used by a user to access an application.

Hereinafter, cases in which the association application among a plurality of applications operates in the management system 50 are described. The token checker 53 is implemented by the instructions from the CPU 501 caused by the operation of the association application, and checks the access token sent from the communication terminal 10.

The association manager 54 is implemented by the instructions from the CPU 501 illustrated in FIG. 3, which are made due to the operation of the association application, and manages the authorization management table.

The data processor 59 may be substantially implemented by the instructions from the CPU 501 and the HDD 505 each of which is illustrated in FIG. 3, or may be implemented only by the instructions from the CPU 501. The data processor 59 performs processing to store various types of data in the memory 5000 or read various types of data stored in the memory 5000.

<Operation>

Next, operation of the communication terminal 10 and the management system 50 that together configure the communication system 1 is described. Firstly, the authentication processes according to the present embodiment are described with reference to FIG. 6.

Figure 6:
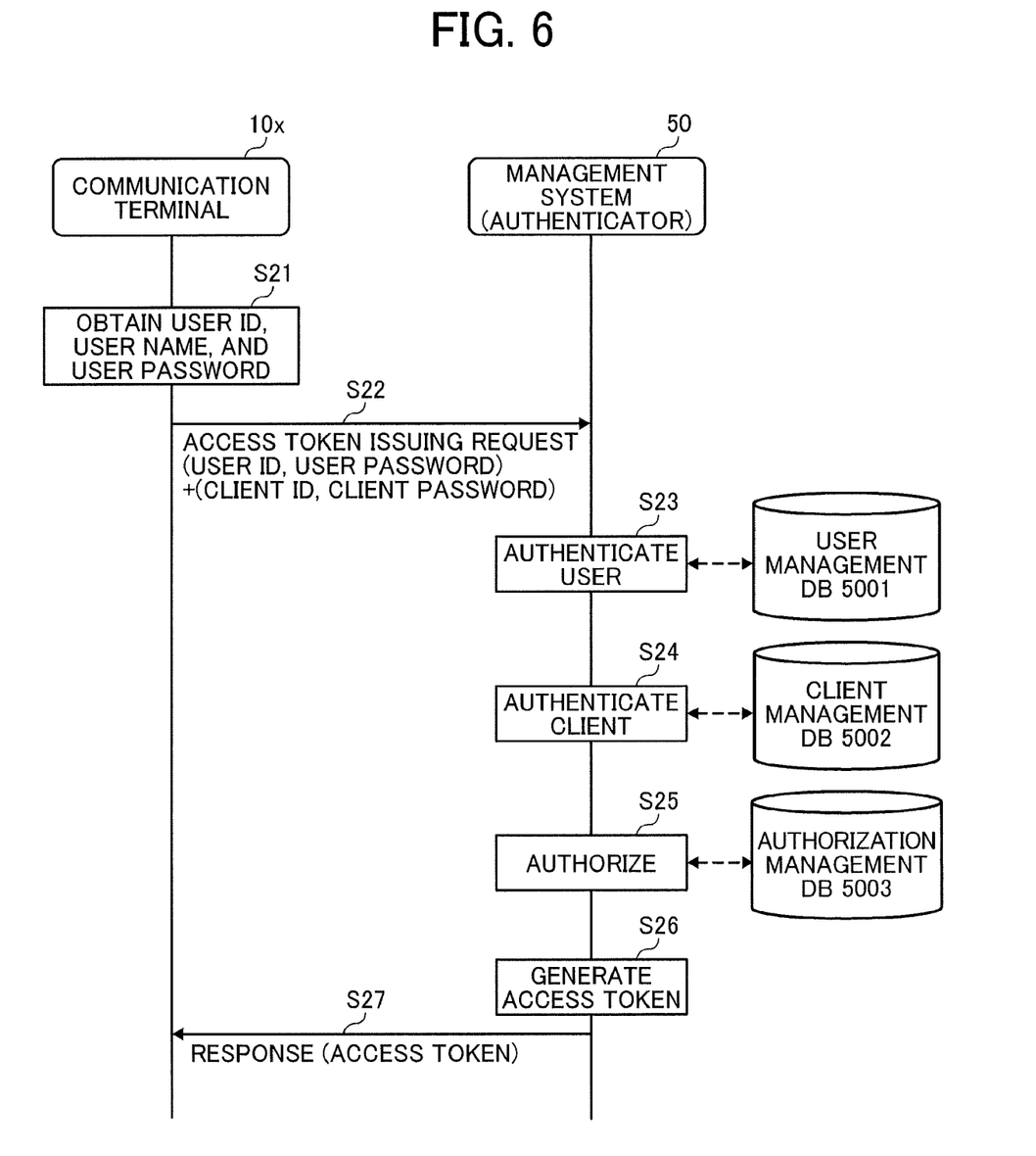
FIG. 6 is a sequence diagram illustrating authentication processes according to an embodiment of the present disclosure.

FIG. 6 is a sequence diagram illustrating the authentication processes according to the present embodiment.

Firstly, example processes in which the communication terminal 10*x* of the user x sends a request to use the association application to the management system 50 are described. Note that processes in which another communication terminal 10 of a different user sends a request to use another application are similar to the processes as described below except that the user ID and the user password, the communication terminal 10, the client ID, and the client password are replaced with the ones that correspond to that another communication terminal, that another application, and that another user.

When the communication terminal 10 receives the request to use the association application made by the user x, the communication terminal 10 obtains, from the user x or the memory 1000, the user ID "user01" and user password "1x1x" of the user x as well as the client ID "C00" and client password "www" of the association application (step S21). In this configuration, the operation acceptance unit 12 of the communication terminal 10*x* may obtain the user ID, the user password, the client ID, or the client password that are input by the user x. Alternatively, the data processor 19 of the communication terminal 10*x* may obtain the user ID, the user password, the client ID, or the client password that are stored in the memory 1000 in advance.

The data transmitter and receiver 11 of the communication terminal 10*x* sends an access token issuing request including the user ID, the user password, the client ID, and the client password obtained in the step S21 to the management system 50 (step S22).

The data transmitter and receiver 51 of the management system 50 receives the access token issuing request sent from the communication terminal 10*x*. The authenticator 52 of the management system 50 determines whether the pair of the user ID and the user password included in the access token issuing request is stored in the user management table (see FIG. 5A). By so doing, the authenticator 52 of the management system 50 authenticates the user (step S23). In the present embodiment, when it is determined that the pair of the user ID and the user password is stored in the user management table, the authenticator 52 successfully authenticates the user. When it is determined that the pair of the user ID and the user password is not stored in the user management table, the authenticator 52 fails to authenticate the user.

When the user authentication is successfully completed, the authenticator 52 of the management system 50 determines whether the pair of the client ID and the client password included in the access token issuing request is stored in the client management table (see FIG. 5B). By so doing, the authenticator 52 of the management system 50 authenticates the client (step S24). In the present embodiment, when it is determined that the pair of the client ID and the client password is stored in the client management table, the authenticator 52 successfully authenticates the client. When it is determined that the pair of the client ID and the client password is not stored in the client management table, the authenticator 52 fails to authenticate the client.

When the client is successfully authenticated, the authenticator 52 of the management system 50 determines whether the pair of the user ID and the client ID included in the access token issuing request is stored in the authorization management table (see FIG. 5C). When it is determined that the pair of the user ID and the client ID is stored in the authorization management table, the authenticator 52 determines whether the current time is within the available period that is associated with the pair of the user ID and the client ID as above. When it is determined that the current time is within the available period, the authenticator 52 authorizes the use of the association application by the user x (step S25). On the other hand, when it is determined that the pair of the client ID and the service ID is not stored in the service authorization management table or when it is determined that the current time is not within the available period, the authenticator 52 fails to give the above authorization.

When the authorization is successfully completed, the authenticator 52 generates an access token indicating that the user x has been authorized to use the association application (step S26). In so doing, as the scope, the authenticator 52 includes in the access token the client ID "C00" of the association application and the user ID "user01" of the user x who has been authenticated and has been authorized to use the association application.

The data transmitter and receiver 51 of the management system 50, as a response to the access token issuing request, sends a response indicating whether the above authorization was successful to the communication terminal 10x that has sent the access token issuing request (step S27). When the authorization is successfully completed, the data transmitter and receiver 51 incorporates the access token generated in the step S26 into the response, and sends the response to the communication terminal 10x. The data transmitter and receiver 11 of the communication terminal 10x receives the response sent from the management system 50.

Hereinafter, cases are described in which the authorization of the use of the association application was successful and the communication terminal 10x has received a response including an access token. In the processes described below, the communication terminal 10x of the user x uses the association application to associate the screen sharing application that is developed by the third party to which the user x belongs, the user a who has paid the bill for the use of the screen sharing application, and the available period that is determined by the billed amount with each other. Note that the processes of associating another application with another user are similar to the processes as described below except that the user ID, the user password, the client ID, and the client password are replaced with the ones that correspond to that another application and that another user.

Figure 7:
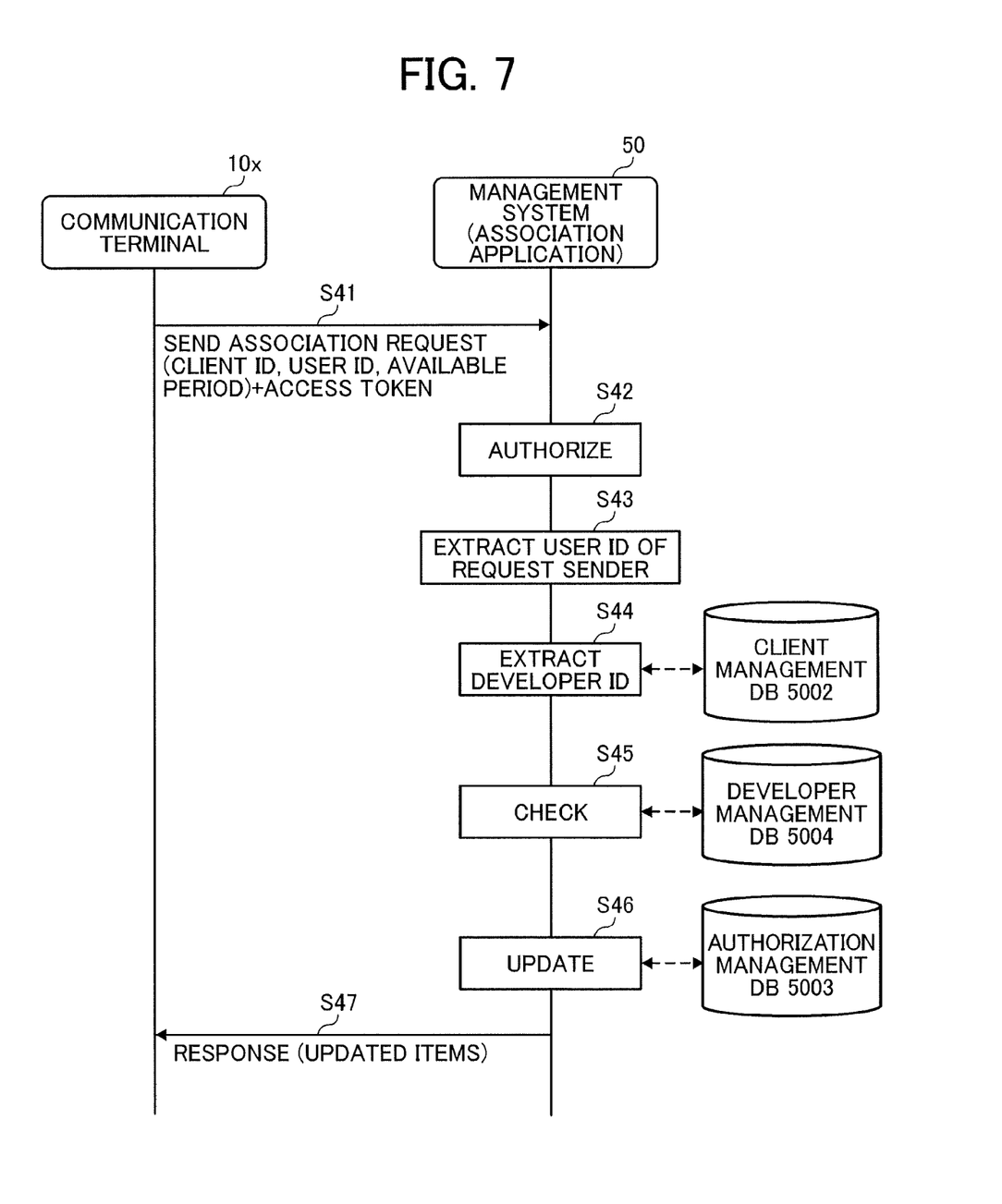
FIG. 7 is a sequence diagram illustrating the processes of associating a user with an application, according to an embodiment of the present disclosure.

FIG. 7 is a sequence diagram illustrating the processes of associating a user with an application, according to the present embodiment.

The data transmitter and receiver 11 of the communication terminal 10x sends to the management system 50 an association request requesting to associate the screen sharing application, the user a, and the available period with each other (step S41). The association request includes the client ID "C01" of the screen sharing application, the user ID "user03" of the user a, and the available period "2016/6/1-2018/5/31" as an example of the available period that is determined by the billed amount, as well as the access token included in the previously-received response, which are to be associated with each other.

The data transmitter and receiver 51 of the management system 50 receives the association request sent from the communication terminal 10x. The token checker 53 of the management system 50 checks the access token, for example, by checking the scope. Subsequently, the token checker 53 authorizes the association-request sender to use the association application by confirming that the user ID of the user x is included in the access token as an object for which the use of the application is to be authorized (step S42).

Once the use of the application is authorized, the token checker 53 extracts the user ID "user01" of the user x from the access token (step S43).

The association manager 54 of the management system 50 uses the client ID "C01" of the screen sharing application included in the association request as a search key to search the client management table (see FIG. 5B) and extract the associated developer ID "dev01" of the screen sharing application (step S44).

The association manager 54 of the management system 50 checks whether the pair of the user ID "user01" extracted in the step S43 and the developer ID "dev01" extracted in the step S44 is managed in the developer management table (see FIG. 5D) (step S45).

When it is determined in the step S45 that the above pair of the user ID and the developer ID is managed in the developer management table, the association manager 54 authorizes the association request. When it is determined in the step S45 that the above pair of the user ID and the developer ID is not managed in the developer management table, the association manager 54 rejects the association request.

Once the association request is authorized, the association manager 54 of the management system 50 stores the client ID "C01" included in the association request, the user ID "user03", and the available period "2016/6/1-2018/5/31" in the developer management table in association with each other, and updates the authorization management table (step S46).

The data transmitter and receiver 51 of the management system 50, as a response to the association request, sends a response including the items updated in the step S46 to the communication terminal 10x that is the association-request sender (step S47). Due to this configuration, the data transmitter and receiver of the communication terminal 10x receives the response including the updated items.

Next, some effects of the above example embodiments of the present disclosure are described. With the management method according to the embodiments as described above, the data transmitter and receiver 51 of the management system 50 (an example of a receiver) receives a request to associate the user ID of the user a (an example of the identification information of a first user) with the client ID of the screen sharing application that the user a is authorized to use (an example of the identification information of a first client), and an access token including the user ID (an example of the identification information of a second user) of the user x who has been authenticated and has been authorized to use the association application (an example of a second client). When the user ID of the user x matches certain information that corresponds to the screen sharing application, the association manager 54 of the management system 50 (i.e., an example of an execution unit) associates the user ID of the user a with the client ID of the screen sharing application. According to this method, the management system 50 can appropriately associate the users with the client applications that these users are authorized to use, within the scope of the authority on the user side in the communication system 1.

The authorization management DB 5003 of the management system 50 (i.e., an example of a first manager) stores the user ID and the client ID of the client application that the user is authorized to use in association with each other. When the user ID of the user x matches certain information that corresponds to the screen sharing application, the association manager 54 of the management system 50 associates the user ID of the user a with the client ID of the screen sharing application in the authorization management DB 5003. Due to this configuration, the management system 50 can manage the associated pair of the user ID and the client ID in the authorization management DB 5003.

The developer management DB 5004 of the management system 50 (i.e., an example of a second manager) manages the user ID of the users who belong to the developer party, for each one of the developers of application. When the user ID of the user x is stored in the developer management DB 5004 as the user ID of the users who belong to the developer party of the screen sharing application, the association manager 54 of the management system 50 associates the user ID of the user a with the client ID of the screen sharing application in the authorization management DB 5003. Due to this configuration, the association manager 54 of the management system 50 can determine whether or not to perform the processes requested in the association request based on the data managed in the developer management DB 5004.

The client management DB 5002 of the management system 50 (i.e., an example of a third manager) manages the client ID and the developer ID in association with each other. When the client ID of the screen sharing application is associated with the developer ID of the developer ID to which the user x belongs in the client management DB 5002, the association manager 54 of the management system 50 associates the user ID of the user a with the client ID of the screen sharing application in the authorization management table. Due to this configuration, the association application of the management system 50 can determine whether or not to perform the processes requested in the association request based on the data managed in the client management DB 5002.

The authenticator 52 of the management system 50 (i.e., an example of a generator) generates an access token that includes the user ID of a user who has sent a request to use an application after authenticating the user who has sent that request and authorizing the request-sender user to use the application. The data transmitter and receiver 51 of the management system 50 receives the access token generated by the authenticator 52. Due to this configuration, the association application of the management system 50 can determine whether or not to perform the processes requested in the association request, using the received access token.

The data transmitter and receiver 51 of the management system 50 (an example of a transmitter and a receiver) transmits the access token to the communication terminal 10, and receives the access token sent from the communication terminal 10. Due to this configuration, the association application of the management system 50 can determine whether or not to perform the processes requested in the association request, using the access token sent from the communication terminal 10.

Further, the control programs for the communication terminal 10 and the management system 50 may be recorded in a file format installable or executable on a computer-readable recording medium such as the recording medium 106 for distribution. Examples of such recording medium include, but not limited to, compact disc-recordable (CD-R), digital versatile disc (DVD), and Blu-ray disc.

Note also that a recording medium such as a CD-ROM storing the programs according to the example embodiment as described above or the HD 504 storing these programs may be distributed as a program product at home and abroad.

The communication terminal 10 and the management system 50 according to the embodiment as described above may be configured by a single computer or a plurality of computers to which functions or units are allocated as desired in a divided manner. For example, the management system 50 may be configured by the first device for authentication from which the token checker 53 and the association manager 54 in the functional configuration of the management system 50 illustrated in FIG. 4 are removed, or the second device from which the authenticator 52 in the functional configuration of the management system 50 illustrated in FIG. 4 is removed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The processing circuit herein includes, for example, devices such as a processor that is programmed to execute software to implement functions, like a processor with electronic circuits, an application specific integrated circuit (ASIC) that is designed to execute the above functions, and a circuit module known in the art.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A management system comprising:
  a receiver to receive
    a request to associate identification information of a first user with identification information of a first client application that the first user is authorized to use, and identification information of a second user who has been authenticated and has been authorized to use a second client application;
circuitry to
  determine whether the identification information of the second user matches certain information that corresponds to the first client application,
  associate the identification information of the first user with the identification information of the first client application when the identification information of the second user matches the certain information that corresponds to the first client application, and
  generate, in response to the request, an access token including identification information of the first user, after authenticating the first user, and authorize the first user to use the first client application; and
a memory to store, for each user, identification information of the user and identification information of a client application that the user is authorized to use, in association with each other, the user including at least the second user,
wherein the receiver receives the access token,
when the identification information of the second user matches the certain information that corresponds to the first client application, the circuitry stores in the memory the identification information of the first user in association with the identification information of the first client application,
the memory further stores, for each developer of the client application, identification information of a user who belongs to the developer, and
when the identification information of the second user matches the identification information of the user who belongs to the developer of the first client application in the memory, the circuitry associates the identification information of the first user with the identification information of the first client application in the memory.

2. The management system according to claim 1, wherein the memory further stores, for each client application, identification information of the client application and identification information of the developer of the client application, in association with each other, and
when the identification information of the first client application is stored in association with identification information of the developer to which the second user belongs in the memory, the circuitry associates the identification information of the first user with the identification information of the first client application in the memory.

3. The management system according to claim 1, further comprising:
a transmitter to transmit the access token to a communication terminal in response to the request to use the client application,
wherein the receiver receives the access token sent from the communication terminal.

4. A communication system comprising:
the management system according to claim 3; and
a communication terminal configured to send the access token to the management system.

5. A method of causing an apparatus that includes a receiver coupled to circuitry to perform management, the method comprising:

receiving, with the receiver, a request to associate identification information of a first user with identification information of a first client application that the first user is authorized to use;
receiving, with the receiver, identification information of a second user who has been authenticated and has been authorized to use a second client application;
determining, with the circuitry, whether the identification information of the second user matches certain information that corresponds to the first client application; and
associating, with the circuitry, the identification information of the first user with the identification information of the first client application when the identification information of the second user matches the certain information that corresponds to the first client application;
generating, with the circuitry and in response to the request, an access token including the identification information of the first user, after authenticating the first user, and authorize the first user to use the first client application;
storing, in a memory and for each user, identification information of the user and identification information of a client application that the user is authorized to use, in association with each other, the user including at least the second user; and
receiving, with the receiver, the access token,
wherein when the identification information of the second user matches the certain information that corresponds to the first client application, the identification information of the first user is stored in the memory in association with the identification information of the first client application,
for each developer of the client application, identification information of a user who belongs to the developer is stored in the memory, and
when the identification information of the second user matches the identification information of the user who belongs to the developer of the first client application in the memory, the identification information of the first user is associated with the identification information of the first client application in the memory.

6. The method according to claim 5, further comprising:
authenticating a user who has sent a request to use a client application;
authorizing the user who has sent the request to use the client application to use the client application;
generating an access token including identification information of the user who has sent the request to use the client application after the authenticating and the authorizing;
transmitting the access token to a communication terminal operated by the user who has sent the request to use the client application; and
receiving the access token sent from the communication terminal.

7. The management system according to claim 1, wherein at least one of the first client application and the second client application is a screen-sharing application.

8. The management system according to claim 1, wherein the identification information of the first user is not associated with the identification information of the first client application when the identification information of the second user does not match the certain information that corresponds to the first client application.

* * * * *